UNITED STATES PATENT OFFICE.

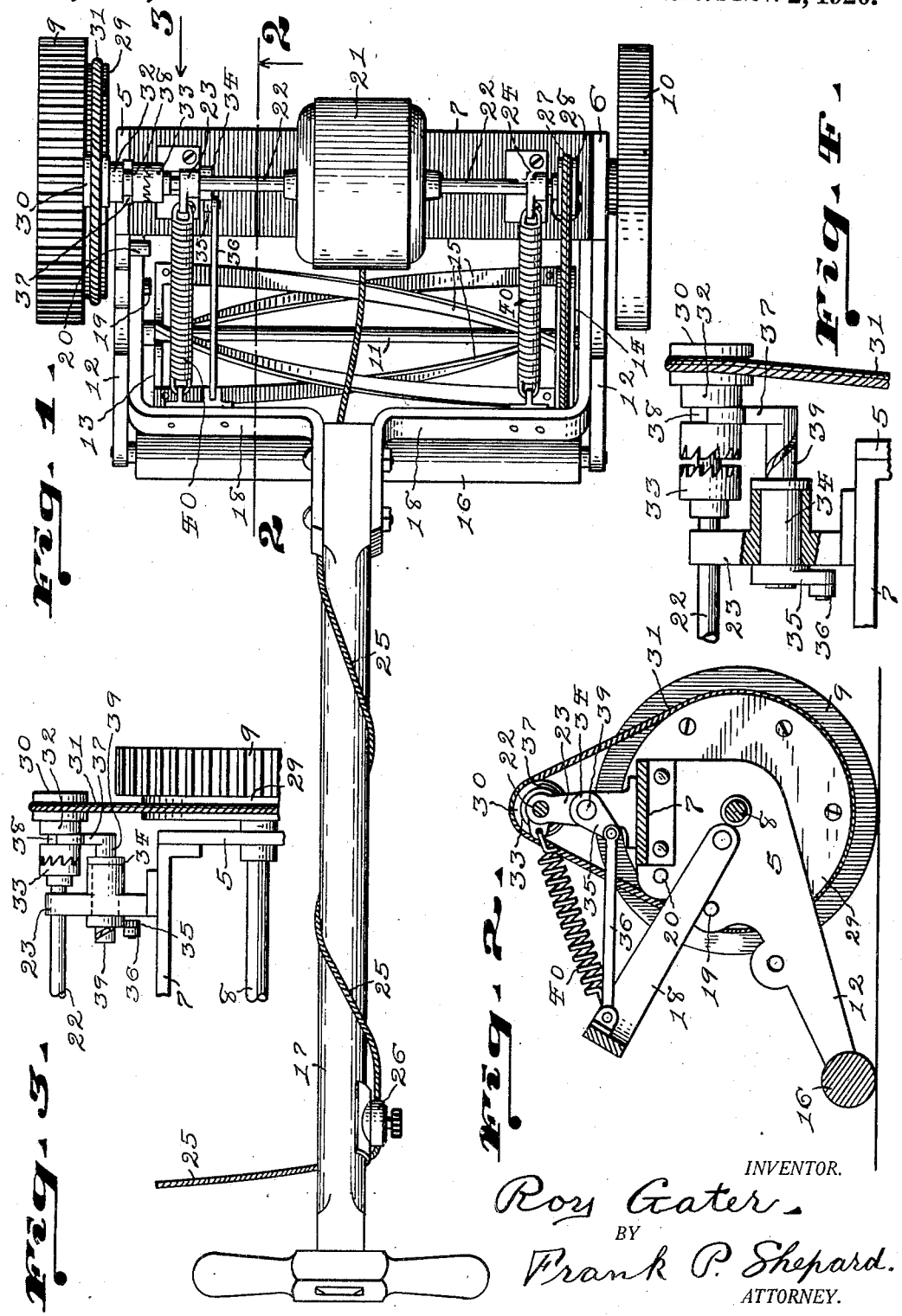

ROY GATER, OF OKLAHOMA, OKLAHOMA.

LAWN-MOWER.

1,357,396.　　　　　Specification of Letters Patent.　　Patented Nov. 2, 1920.

Application filed February 6, 1920. Serial No. 356,598.

*To all whom it may concern:*

Be it known that I, ROY GATER, a citizen of the United States, residing at Oklahoma, in the county of Oklahoma and State of Oklahoma, have invented certain new and useful Improvements in Lawn-Mowers, of which the following is a specification, reference being had to the accompanying drawings.

An object of the invention is to provide a lawn mower which will require less manual labor to propel and control.

Other objects and advantages of the invention will be set forth in the ensuing description.

Figure 1 of the drawings is a plan view of a lawn mower embodying the principles of the invention, the right-hand end of the figure being taken as the front of the machine.

Fig. 2 is a sectional view taken on the line 2—2 of Fig. 1, but with certain revolving knives omitted.

Fig. 3 is a fragmental elevation view in the direction of the arrow 3 of Fig. 1.

Fig. 4 is a reproduction of a portion of Fig. 3, but partly in section and with certain driving mechanism thrown out of gear.

Like characters of reference designate like parts in all the figures.

The frame-work of the machine shown in this instance consists of the two cast-metal side plates 5 and 6 and the transversely-extending yoke 7 which is riveted to and connects the upper part of said plates.

A shaft 8 is journaled transversely through the two plates 5 and 6, and supporting ground wheels 9 and 10 are mounted on the ends of said shaft outside the frame-work.

One of the wheels 9 and 10 should be free to revolve on the shaft 8 to allow the machine to be propelled in a curved line.

A smaller shaft 11 is journaled transversely in the rearwardly-extending portions 12 of the plates 5 and 6 and is provided with end spiders 13 and 14 which carry the usual grass-cutting knives 15.

A roller 16 is journaled transversely of the machine in the extreme rear ends of the plates 5 and 6 and contacts the ground to gage the cutting depth of the knives 15.

A push-bar 17 is employed to control the movements of the machine, the front end of this push-bar being provided with outwardly and downwardly forked strap-metal arms 18 whose lower front ends are pivoted to the side plates 5 and 6 close to the shaft 8.

The pivotal connection of the push-bar 17 with the frame-work of the machine allows it limited vertical swinging movement between two limiting pins 19 and 20 which are set in the side plates 5 and 6.

The parts thus described are well known in the art.

In carrying out the objects stated, an electric motor 21 is mounted on the yoke 7 to propel the machine and drive its grass-cutting blades 15, the shaft 22 of this motor extending well outward laterally on both sides and being journaled in upstanding bearings 23 and 24 on the ends of the yoke 7.

Suitable wiring in a flexible conduit 25 may lead from a convenient source of electric current, and a switch to control the current may be mounted on the push-bar 17.

The spider 14 of the shaft 11 is in the form of a grooved belt pulley, and the knives 15 are driven by a belt 27 which operatively connects this belt pulley with a smaller grooved belt pulley 28 on the end of the motor shaft 22.

The knives 15, therefore, are started and stopped by use of the switch 26 in turning the current on and off.

To propel the machine, the ground wheel 9 is arranged as a driving wheel and provided with a grooved belt pulley 29 which is driven from a smaller belt pulley 30 on the motor shaft 22 through a belt 31.

The belt pulley 30 is mounted loosely on the motor shaft 22 and has integrally formed upon it a gear clutch 32 adapted to be engaged by a similar gear clutch 33 which is mounted tightly on said shaft.

It will be seen that by sliding the belt pulley 30 and its clutch 32 into engagement with the clutch 33 of the shaft 22 the machine will start to travel over the ground, and, so long as the motor 21 runs, the traveling movement will continue until the clutches are thrown apart.

To shift the belt pulley 30 and clutch 32, a sleeve 34 is journaled revolubly in the upstanding bearing 23 below and parallel with the motor shaft 22.

A depending crank arm 35 on the sleeve 34 is operatively connected, by a connecting-rod 36, to one of the arms 18 of the push-bar 17, so that vertical swinging movement imparted to the push-bar by the operator rotates the sleeve.

A gear-shifting fork 37 engages a circumferential groove 38 in the clutch 32 of the belt pulley 30, and this fork has a stem 39 which is screwthreaded axially through the sleeve 34.

It will be seen that by swinging the push-bar 17 upward, as is commonly done in attempting to push a lawn mower forward, the sleeve 34 will be rotated; and that the stem which is screwthreaded through the sleeve and is held against revolving movement by engagement of its fork 37 with the clutch 32 will be drawn inward to bring said clutch into engagement with the clutch 33 and start the traveling movement of the machine.

To support part of the weight of the push-bar 17, its forked arms 18 may be connected to the upper ends of the bearings 23 and 24 by tension springs 40.

These springs 40 should be limited in strength, so that when the machine is unattended a runaway will not be caused by holding the push-bar 17 upward.

The following is claimed:—

1. In a lawn mower, a suitable frame-work provided with wheels and adapted to be propelled, a motor carried by the frame-work, a push-bar movably connected to the frame-work, and means whereby movement of the push-bar with respect to the frame-work places said frame-work under control of the source of power.

2. In a lawn-mower, a suitable frame-work provided with ground wheels and adapted to be propelled, a motor carried by the frame-work to propel it, a push-bar movably connected to the frame-work, and means whereby movement of the push-bar with respect to the frame-work causes the source of power to propel the frame-work.

3. In a lawn mower, a frame-work having ground wheels and adapted to be propelled, a motor carried upon the frame-work, a releasable clutch mechanism connecting the motor to the ground wheels, a push-bar pivoted to the frame-work, means whereby the shifting of the push-bar to one position with respect to the frame-work releases the clutch mechanism, and means whereby the shifting of said push-bar to another position restores the clutch connection between the motor and ground wheels.

Witness my hand this 7th day of January, 1920.

ROY GATER.